United States Patent
Okamoto et al.

(10) Patent No.: US 8,347,639 B2
(45) Date of Patent: Jan. 8, 2013

(54) METHOD AND APPARATUS FOR TEMPERING TREATMENT OF MEAT, TEMPERED MEAT TREATED BY THE METHOD, AND REFRIGERATED MEAT STORAGE

(75) Inventors: Naoto Okamoto, Tokyo (JP); Suguru Sakuramoto, Tokyo (JP); Takahiro Arai, Tokyo (JP); Kouichi Tsubata, Tokyo (JP); Akira Taniyama, Tokyo (JP)

(73) Assignee: Mayekawa Mfg. Co., Ltd. (JP)

( * ) Notice: Subject to any disclaimer, the term of this patent is extended or adjusted under 35 U.S.C. 154(b) by 237 days.

(21) Appl. No.: 12/563,783

(22) Filed: Sep. 21, 2009

(65) Prior Publication Data
US 2010/0075016 A1 Mar. 25, 2010

Related U.S. Application Data

(63) Continuation of application No. PCT/JP2008/054340, filed on Mar. 11, 2008.

(60) Provisional application No. 60/895,886, filed on Mar. 20, 2007.

(51) Int. Cl.
*F25D 13/06* (2006.01)
*F25D 13/04* (2006.01)
*F25D 13/02* (2006.01)
*A23B 4/00* (2006.01)
*A23B 4/06* (2006.01)

(52) U.S. Cl. ......... 62/63; 62/62; 62/64; 62/374; 99/516; 99/517; 426/524

(58) Field of Classification Search .................. 426/524, 426/647, 644, 641, 418, 474, 384, 385; 62/62, 62/63, 64, 373, 374, 467; 99/516, 517
See application file for complete search history.

(56) References Cited

U.S. PATENT DOCUMENTS 2,876,109 A * 3/1959 Hemery et al. .................. 62/65
4,700,547 A 10/1987 Hayashi
4,940,599 A * 7/1990 Engler et al. .................. 426/524
(Continued)

FOREIGN PATENT DOCUMENTS
JP 61-271945 A 12/1986
(Continued)

OTHER PUBLICATIONS

International Search Report for Corresponding PCT/JP2008/054340 mailed Aug. 19, 2008.

*Primary Examiner* — D Lawrence Tarazano
*Assistant Examiner* — Stephanie Cox
(74) *Attorney, Agent, or Firm* — Rossi, Kimms & McDowell LLP

(57) ABSTRACT

A tempering treatment method whereby the temperature of meat, which involves a carcass prepared by slaughtering cattle or poultry and sterilizing and washing, is lowered as close to the ice storage temperature as possible to prevent a temperature rise caused by the actions of enzymes contained within the meat before transporting the meat to a refrigerated storage, which comprises surface-freezing the meat by blowing a cold air stream at about −20 to about −40° C. to the meat before conducting the tempering treatment, thus allowing the generation of freezing latent heat in the subcutaneous part owing to the surface-freezing (freezing the subcutaneous tissue), and then rapidly lowering the core temperature inside the meat due to the latent heat released at the melting of the freezing latent heat to thereby conduct the tempering treatment at a temperature of 0 to +15° C.

5 Claims, 8 Drawing Sheets

U.S. PATENT DOCUMENTS

| | | |
|---|---|---|
| 6,481,220 B2 * | 11/2002 | Butler .............................. 62/64 |
| 2003/0037563 A1 * | 2/2003 | Maxwell et al. ................ 62/375 |
| 2004/0211194 A1 * | 10/2004 | Kaminski et al. ................ 62/64 |

FOREIGN PATENT DOCUMENTS

| | | | |
|---|---|---|---|
| JP | 64020054 A | | 1/1989 |
| JP | 3049641 A | | 3/1991 |
| JP | 4330246 A | | 11/1992 |
| JP | 2000139591 A | | 5/2000 |
| JP | 2001061403 A | * | 3/2001 |
| JP | 2001078660 A | | 3/2001 |
| JP | 2003021446 A | | 1/2003 |

* cited by examiner

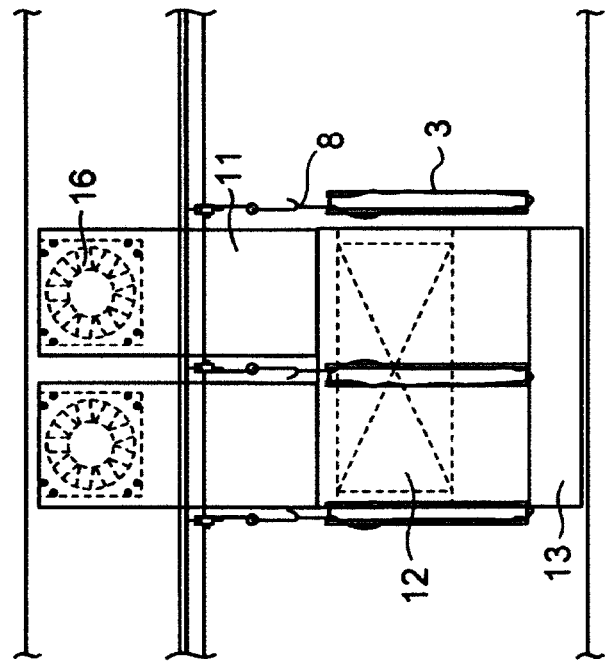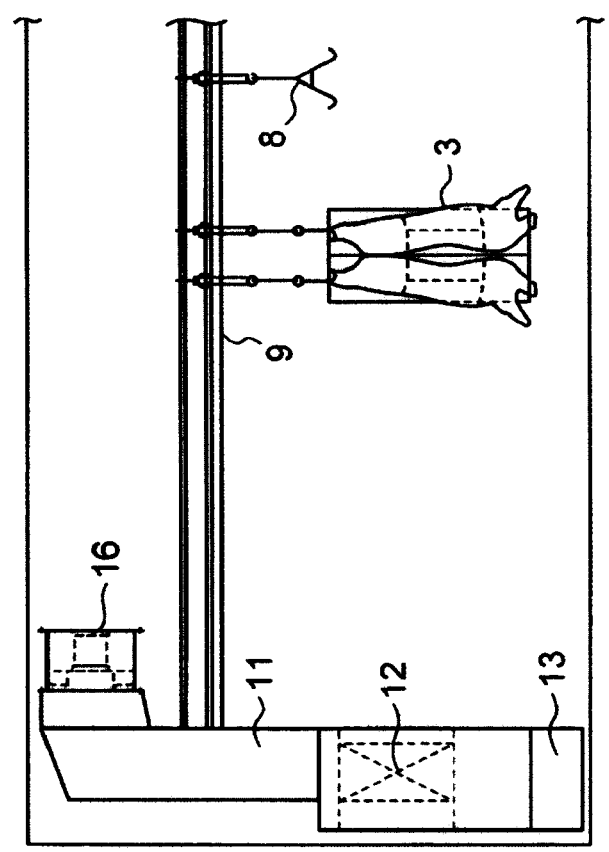

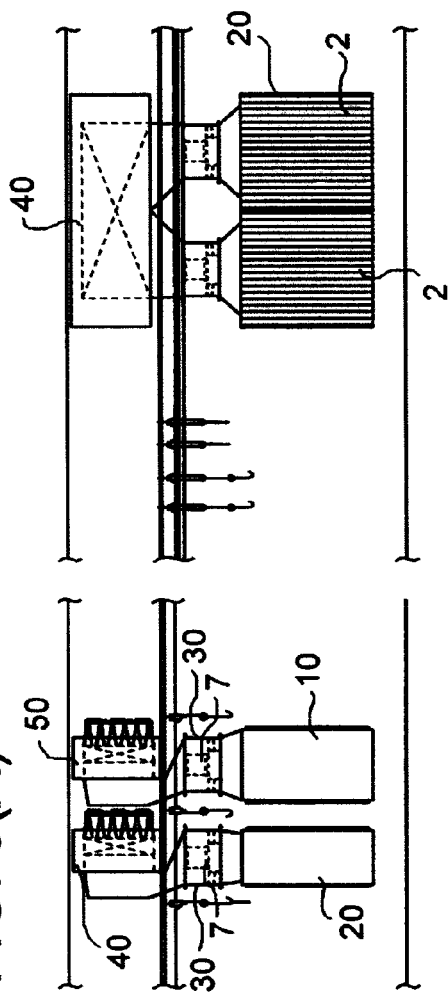
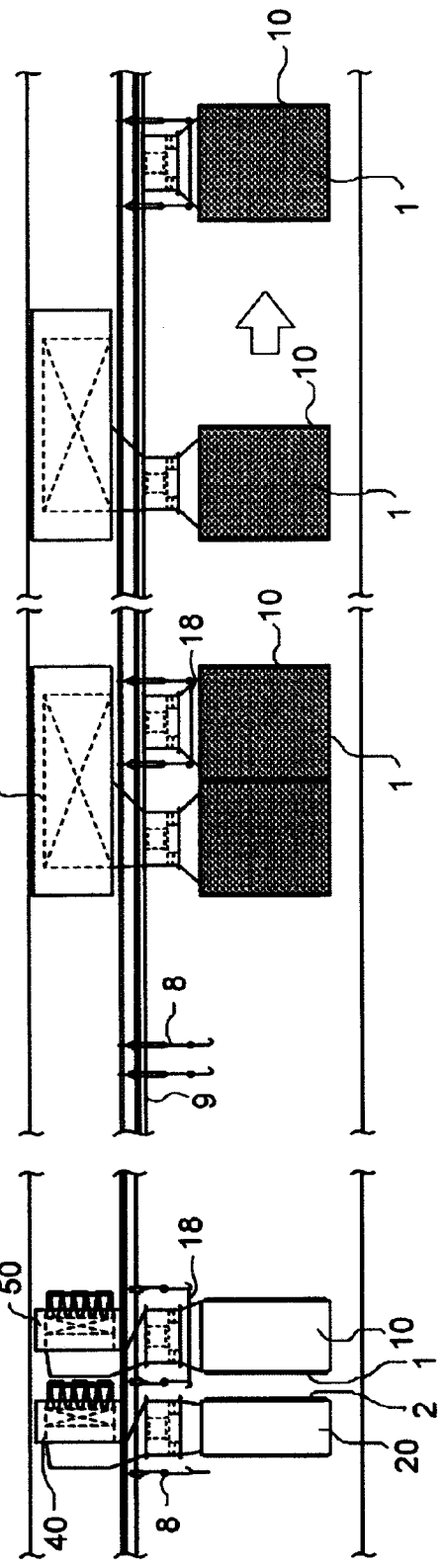

| Test No. | Carried-in carcass (kg) | After surface freezing (kg) | Weight reduction rate (%) | After tempering (kg) | Weight reduction rate (%) |
|---|---|---|---|---|---|
| 2 | 84.08 | 83.48 | 0.71 | 83.52 | 0.67 |
| 3 | 74.54 | 74.03 | 0.68 | 73.84 | 0.94 |
| 4 | 75.58 | 75.46 | 0.16 | 75.34 | 0.32 |

METHOD AND APPARATUS FOR TEMPERING TREATMENT OF MEAT, TEMPERED MEAT TREATED BY THE METHOD, AND REFRIGERATED MEAT STORAGE

CROSS-REFERENCE TO RELATED APPLICATIONS

This application is a continuation of PCT/JP2008/054340 filed on Mar. 11, 2008, which in turn claims priority from U.S. Provisional Application No. 60/895,886, filed Mar. 20, 2007.

BACKGROUND

The present invention relates to a treating method ideal for preserving freshness of carcasses in a processing line of carcass, an apparatus used for the treatment, tempered meat treated by the method, and a storage for the tempered meat, more concretively, to a method and apparatus for tempering treatment of meat, tempered meat treated by the tempering method, and a refrigerator storage for storing the meat treated by the tempering method.

Conventionally, in a carcass treating line, processing advances in the sequence of slaughtering cattle, blood letting, cutting off legs and horns, pretreatment, skin scraping, washing, breast cutting open, head cutting off, evisceration, back cutting, carcass inspection, dressing, and sterilizing and washing.

The carcass sterilized and washed in the last step is transferred to a refrigerator for storage, where the carcass is stored for a length of time until it is supplied for human consumption.

Temperature of the sterilized and washed carcass rises due to the activity of enzymes inside the meat. Therefore, there arises a need to lower the temperature (i.e. to perform tempering treatment) before the carcass is transferred to the refrigerator for storage. However, in the past, only such a treatment has been performed that air at ordinary temperature is blown on to the carcass as shown in FIG. 8 or the carcass is stored in a refrigerator of inside air temperature of about 15° C. for interim storage, and there has been a problem that the temperature of the carcass lowers slowly and the carcass loses freshness. FIG. 8 shows the inside of a tempering treatment room for performing tempering treatment of pig carcasses, and in the drawing, reference numeral 4 is a cooler for producing air at ordinary temperature, 7 are pig carcasses, 8 are gambrels for suspending the pig carcasses, 9 is a transfer rail for transferring the pig carcasses.

With the method and apparatus disclosed in Japanese Laid-Open Patent Application No. 2001-61403, cool air is directly blown on to the surface of the carcass at high speed, so, occurrence of high temperature of the carcass (high temperature of such a degree that adhesion of microbes to the carcass is not sufficiently suppressed) can be eliminated and moisture on the surface thereof can be removed rapidly. However, as the elimination of occurrence of the high temperature is performed by utilizing sensible heat of the water in the carcass, temperature of the carcass does not lower sufficiently, and in addition, adhesion of microbes to the surface of the carcass due to adhesion of moisture to the surface can not be suppressed sufficiently.

SUMMARY OF THE INVENTION

The present invention was made to solve the problem mentioned above, and the object of the invention is to provide a method and apparatus for tempering food animals and poultry eviscerated and washed, with which the freshness of the meat can be preserved in a good state, a meat treated by the tempering method, and a refrigerated meat storage for storing the meat treated by the tempering method.

The carcass is transferred between slit nozzle plates and hole nozzle plates, cold air jets of temperature of about −20~−40° C. impinges on to the carcass to freeze the subcutaneous tissue part thereof to produce a frozen layer which stores latent cold heat, and the carcass having frozen surface layer is tempered (equalized in its temperature) under a temperature of 0~15° C., preferably 10° C. The frozen layer is unfrozen by absorbing heat from the core part of the carcass, so that the core temperature itself decreases and the carcass is equalized in temperature distribution by this tempering treatment. As shown later in FIG. 1, when surface temperature is decreased to −25° C. by the surface-freezing, the core temperature is still above 10° C. It is thought that the subcutaneous part is frozen when the surface is cooled to −20° C., so that latent cold heat is stored in the subcutaneous part. On the other hand, it is feared that meat inside the surface part may be frozen when the carcass is cooled down until the surface temperature becomes equal or lower than −40° C.

As mentioned above, the present invention proposes a method for tempering a sterilized and washed meat including carcass to lower its temperature as far as possible to an icing storage temperature before the carcass is transferred to a refrigeration storage for the purpose of preventing temperature rise thereof due to actions of enzymes within the carcass, said method comprising; performing freezing on the subcutaneous tissue part of the carcass (hereafter referred to as surface-freezing) by blowing cold air of a temperature equal or lower than that at which the subcutaneous tissue part freezes, preferably a temperature of −20~−40° C. to impinge on to the carcass, whereby producing a frozen layer which stores latent cold heat in the subcutaneous tissue part; and performing tempering of the carcass under an ambient temperature of 0~15° C. after said surface-freezing so that the frozen part absorbs heat from the core part of the carcass to be unfrozen and the core part decreases in temperature rapidly.

When the meat is a carcass, it is preferable that the surface freezing process for freezing subcutaneous tissue part thereof is performed by locating a hole nozzle plate to face the skin side of the carcass and a slit nozzle plate to face the abdominal cavity side of the carcass, and blowing out cold air jets of about −20~−45° C. from the holes and slits of the nozzle plates so as to impinge on to the carcass while it is transferred between both the nozzle plates, and latent cold heat is stored in the subcutaneous part of the carcass. After the surface freezing is performed, the carcass is preferably transferred to a room of temperature of 0~15° C. to be tempered (equalized in temperature distribution).

In the surface freezing process, it is preferable that the flow rate of the cold air jets blown out from the slits of the slit nozzle plate is smaller than that from the holes of the hole nozzle plate and flow velocity of the cold jets from the slits of the slit nozzle plate is larger than that from the holes of the hole nozzle plate.

According to the invention, the subcutaneous tissue part can be frozen most appropriately in accordance with the characteristics of the carcass that the abdominal cavity side has many depressions and the back side (skin side) is relatively flat and smooth by blowing a relatively large amount of cold air jet to impinge on to the back side and a relatively small amount to impinge on to the abdominal cavity side of the carcass. Further, a carcass tempering-treated appropriately while suppressing transpiration of moisture from the surface thereof can be obtained by transferring the surface-frozen carcass to a tempering room in which low temperature high humidity air is circulated and the meat part of the carcass is rapidly decreased in temperature by releasing heat to the frozen subcutaneous tissue part storing latent cold heat.

BRIEF DESCRIPTION OF THE DRAWINGS

FIG. 3A is a front elevation view, FIG. 3B is a side elevation view showing a generating section of jet flow for cooling the surface of the abdominal cavity, and FIG. 3C is a side elevation view showing a generating section of jet flow for cooling the surface of the skin part of a carcass.

FIG. 4A and FIG. 4B are a side elevation and front elevation of a tempering room of low temperature humidification type, respectively.

FIGS. 5A-C are drawings for explaining maintenance method of the jet flow generator unit.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
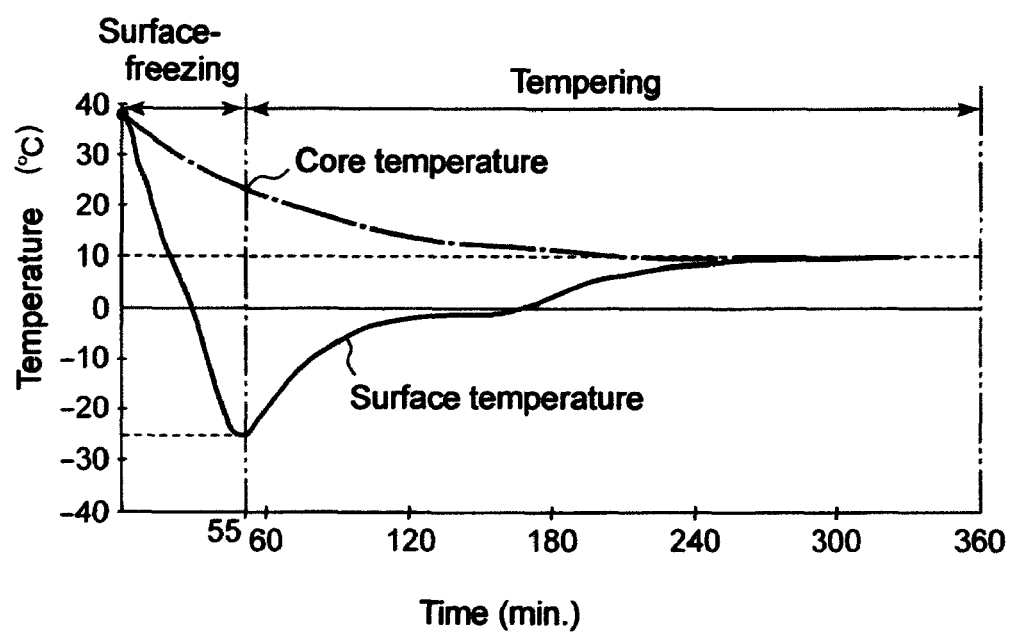
FIG. 1 is an example of time chart showing time-temperature relation when performing surface-freezing and tempering treatment according to the invention.

Basic concept of the present invention will be explained with reference to FIG. 1 and FIGS. 2A-D. FIG. 1 is a time chart showing time-temperature relation of a carcass to which the surface-freezing and tempering treatment according to the invention were performed. The graph shows a pattern of change of temperature as time elapse when performing surface-freezing and tempering treatment of a pig carcass after sterilization and washing for the purpose of preserving freshness. In the first step, the carcass of which temperature has been increased to about 39° C. due to the action of enzymes inside the meat is placed in a freezing room, where surface-freezing of the carcass is performed under about −20° C. to −40° C. while measuring core temperature and surface temperature of the carcass with thermocouples inserted into the interior part and subcutaneous tissue part (including the subcutaneous fat on the surface of the muscle) of the carcass.

In FIG. 1, although the surface-freezing period is 55 minutes, this period is not restrictive as the surface-freezing period, and the freezing is performed until the temperature of the subcutaneous tissue lowers to about −20~−40° C. (−25° C. in the case of FIG. 1).

In the second step, the carcass 3 of which the subcutaneous part has been frozen to −25° C. is transferred to a tempering room (soaking room), where the tempering treatment (soaking, i.e. temperature equalizing) is performed under a temperature of 0~15° C., preferably 10° C.

It is recognized from FIG. 1 that the core temperature of the carcass decreases to 10° C. in about 240~260 minutes by virtue of heat transfer from the meat part to the frozen subcutaneous part which absorbs a large amount of heat of the meat part to be unfrozen and equalization of temperature can be attained rapidly, that is, the carcass is tempered in 240~260 minutes.

Figure 2A:
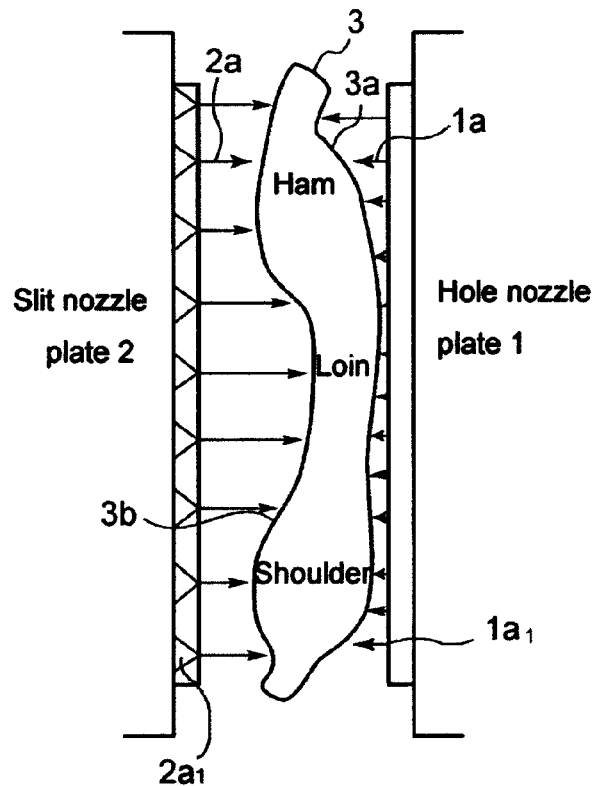
FIG. 2A is a drawing showing basic configuration of surface-freezing treatment.

Outline of the surface-freezing treatment will be explained referring to FIGS. 2A-D. FIG. 2A shows the surface-freezing process. The carcass 3 is transferred in a surface-freezing room between a hole nozzle plate 1 and a slit nozzle plate 2. The hole nozzle plate 1 has a number of vertically and horizontally arrayed holes $1a_1$ from which jets of cold air are blown out to be impinged on to the back 3a of the carcass 3. The slit nozzle plate 2 has a number of vertically extending parallel slits $2a_1$ from which jets of cold air are blown out to be impinged on eviscerated hollow 3b of the carcass 3.

In the surface-freezing room, cold air jets of −20~−45° C. are impinged on to the surface of carcass to freeze the subcutaneous tissue part to store latent cold heat there. In the example of FIG. 1, by spraying cold air jets of −30° C. in the surface freezing room for 55 minutes, the surface temperature of the carcass decreased to −25° C.

Figure 2B:
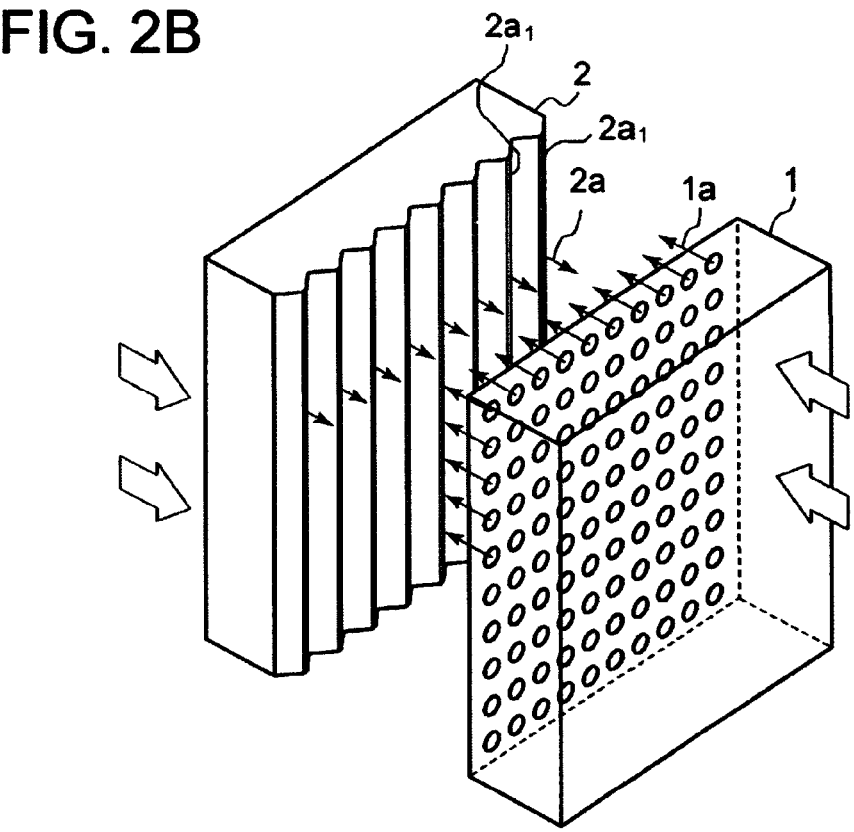
FIG. 2B is a perspective view showing an arrangement of a hole nozzle plate 1 and a slit nozzle plate 2.
Figure 2C:
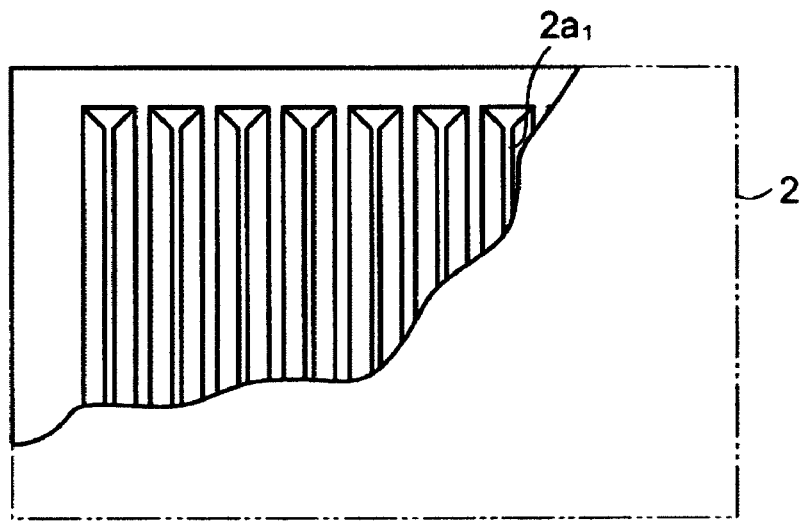
FIG. 2C is a plan view of the slit nozzle plate 2.
Figure 2D:
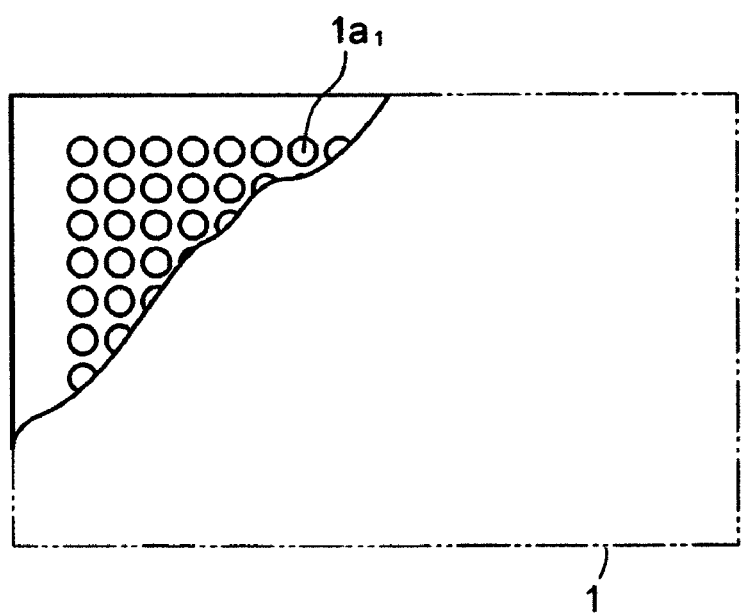
FIG. 2D is a plan view of the hole nozzle plate 1.

The surface-freezing process will be explained in more detail with reference to FIGS. 2A-D. FIG. 2A is a schematic sectional view of the tempering room with a carcass 3 transferred therein, FIG. 2B is a schematic perspective view of the slit nozzle plate 2 and hole nozzle plate 1, FIG. 2C is a front elevation view partially cutaway of the slit nozzle plate 2, and FIG. 2D is a front elevation view partially cutaway of the hole nozzle plate 1. The slit nozzle plate 2 has a number of vertical slits $2a_1$. The slit nozzle plate 2 faces the abdominal cavity side of the carcass 3 and the hole nozzle plate 1 faces the skin side 3a of the carcass 3. Cold air jets 1a and 2a of temperature of about −20~−40° C. are blown out from the nozzle hole $1a_1$ of the hole nozzle plate 2 and nozzle slit $2a_1$ of the slit nozzle plate 2 to impinge on the surface of the carcass to freeze the surface zone on the carcass.

The surface-freezing is performed such that the cold air flow 2a blown out from the slits $2a_1$ of the slit nozzle plate 2 is smaller in flow rate and higher in flow velocity than those of the cold air flow 1a blown out from the holes $1a_1$ of the hole nozzle plate 1. This is because the surface of the abdominal cavity is not flat or smooth with many depressions existing. In addition, as the loin part of the carcass is depressed and positioned remote from the slits, it is aimed to allow the cold air flows impinge evenly as far as possible by increasing flow velocity. As to the skin side 3a, it is aimed to freeze moisture in the subcutaneous tissue layer sufficiently by impinging sufficient amount of cold air flow.

Next, test results will be described hereunder. Test conditions were set under assumption that 1,200 pigs are treated per an hour, i.e. 2,400 left and right carcasses are treated per an hour, weight is 35~45 Kg per one carcass, size is 285 mm width-1,400 mm length-150~170 mm thickness, and temperatures of the carcass are: 39° C.±3° C. at the start of surface-freezing, −10~−20° C. in surface temperature in mid-course of surface freezing, 10° C. or lower when the tempering ends. Cooling load is about 1500 thousands Kcal (only including heat released from the carcasses and fans). The experiment was carried out using a jet flow impinging type surface-freezing machine and low temperature humidification type tempering room.

Figure 3A:
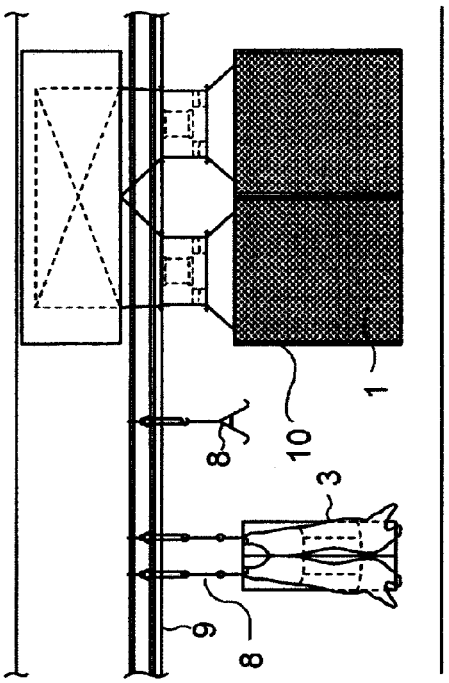
FIGS. 3A-C show construction of a surface freezing device of jet flow impinging type.
Figure 3B:
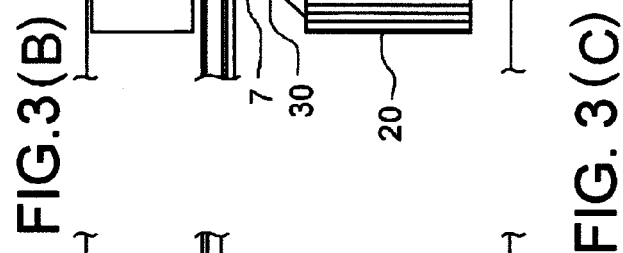
Figure 3C:
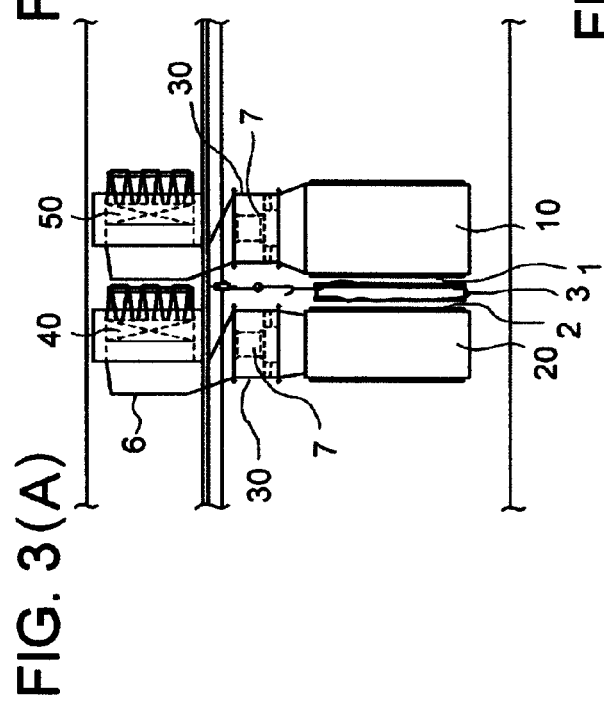

FIGS. 3A-C show a jet flow impinging type surface freezing machine, in which FIG. 3A is a front elevation view, FIG. 3B is a side elevation view showing an jet flow generating part for cooling the abdominal cavity side 3b, and FIG. 3C is a side elevation view showing an jet flow generating part for cooling the skin side 3a.

In the drawings, reference numeral 7 is a fan placed in a duct 30, 20 is a jet flow generating part for cooling abdominal cavity side 3b equipped with slit nozzle plates 2, 10 is a jet flow generating part for cooling skin side 3a equipped with hole nozzle plates 1, 40 is a unit cooler for the jet flow generating part 20 for cooling abdominal cavity side 3b, 50 is a unit cooler for the jet flow generating part 10 for cooling skin side 3a, 6 is a duct, 3 is pig carcass, 8 is a gambrel, and 9 is a transfer rail.

Slit nozzle plates 2 shown in FIGS. 2A-B are provided to a side, which faces abdominal cavity side of the carcass 3, of the jet flow generating part 20, and hole nozzle plates 1 shown in FIGS. 2A-B are provided to a side, which faces the skin side of the carcass 3, of the jet flow generating part 10.

FIGS. 4A, 4B show a low temperature humidification type tempering room, in which FIG. 4A is a side elevation view, and FIG. 4B is a front elevation view.

In the drawings, reference numeral 3 is a pig carcass, 8 is a gambrel for suspending the pig carcass in a state shown in FIG. 2A, 9 is a transfer rail for intermittently transferring the carcass 3 suspended by the gambrel 8 to face the front of a low temperature-high humidity cooler 12 (cooler suitable for use in low temperature high humidity environment), 16 is a fan, 11 is a duct, 12 is a low temperature-high humidity cooler, and 13 is a cold water tank for receiving water adhered to the surface of the carcass provided at a place where the water drops down.

Tempering (temperature equalizing treatment) of the surface-frozen pig carcass 3 is performed by maintaining the air in the room at 0~15° C., preferably 10° C. by blowing high humidity cold air by means of the cooler 12 through the duct 11 to circulate it in the room by the fan 16.

FIG. 5 is a drawing to explain maintenance procedure of the jet flow generator unit including the slit nozzle plates 2 and hole nozzle plates 1 shown in FIG. 2B.

FIG. 5A shows a front elevation view and side elevation view at the stage of preparation of gambrels and attaching a tool 18 for lifting the unit, FIG. 5B shows a front elevation view and side elevation view at the stage of removing the duct 30 and pulling the unit, and FIG. 5C shows a side elevation view at the stage the unit is pulled out. According to the procedure shown in FIGS. 5A-C, the unit including the slit nozzle plates 2 and hole nozzle plates 1 can be removed from the line by utilizing the existing rail 9 for transferring carcasses.

Figure 6:
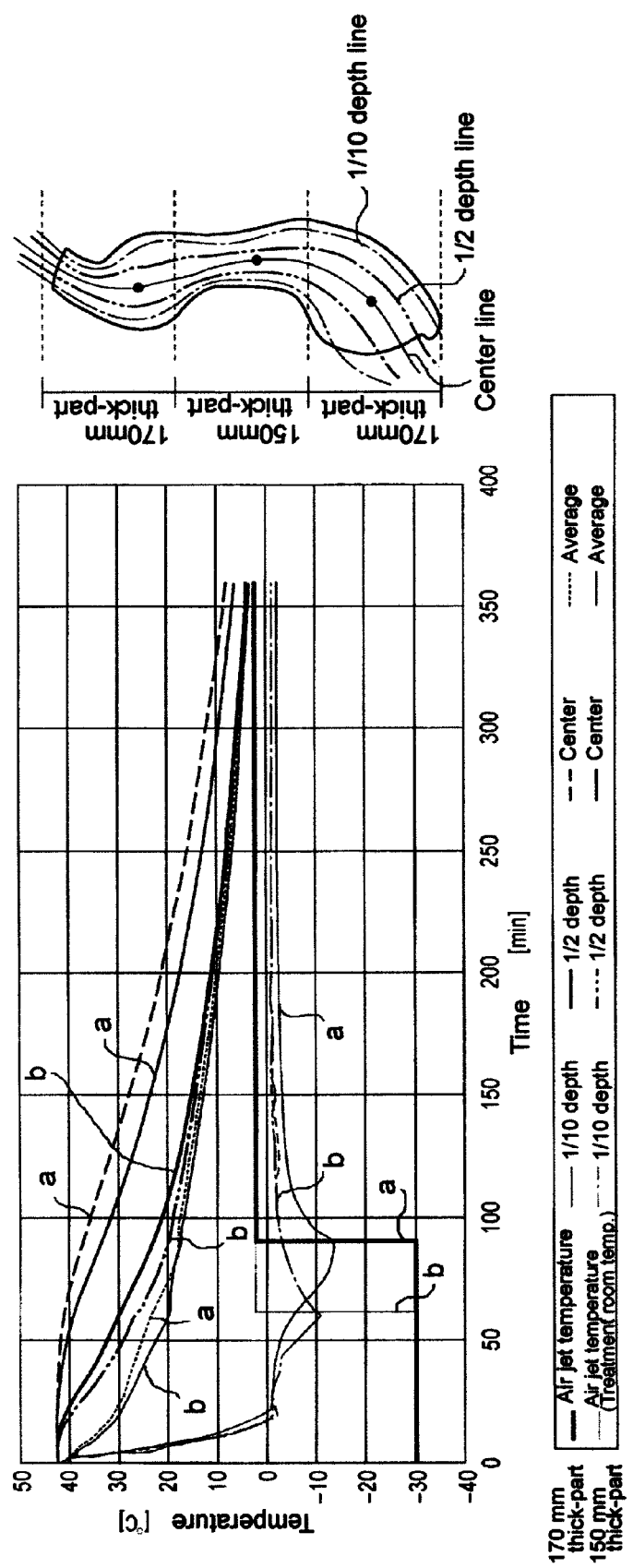
FIG. 6 is a time chart of a test result showing the change of temperature of the carcass with time from the beginning of surface-freezing to the end of tempering treatment.

FIG. 6 shows a result of experiment carried out by using test equipment as shown in FIGS. 3A-C and FIGS. 4A-B. FIG. 6 shows time history of temperatures at several parts of the carcass from the start of surface freezing to the end of tempering treatment. Lower horizontal lines show the temperature of cold air jets impinging on to the carcass in the surface-freezing process and upper horizontal lines show the tempering-room temperature in the tempering process. Air jets of −30° C. is blown for 90 minutes to impinge on to the shoulder part and ham part (maximum thickness is 170 mm) and 60 minutes on the loin part (maximum thickness is 150 mm) between the shoulder part and ham part. Then the carcass is transferred to the tempering room of temperature of 2° C. Uppermost lines show behavior of temperature inside the carcass at a center of thickness of the carcass, the broken line a showing that of 170 mm thick part and solid line b showing that of 150 mm thick part. Temperature behaviors at a point of depth of 1/10 and a point of 1/2 thickness from the surface of the carcass are also shown in FIG. 6.

It can be recognized from the test result of FIG. 6 that acceleration effect of heat transfer due to the surface freezing was verified for a large sized object such as a pig carcass, and treating conditions to attain the objective temperature of 7° C. of the carcass were obtained. Any affection due to the surface freezing was not recognized to the tempering treated articles and weight loss was as good as it was within 1%.

Figures 7, 8:
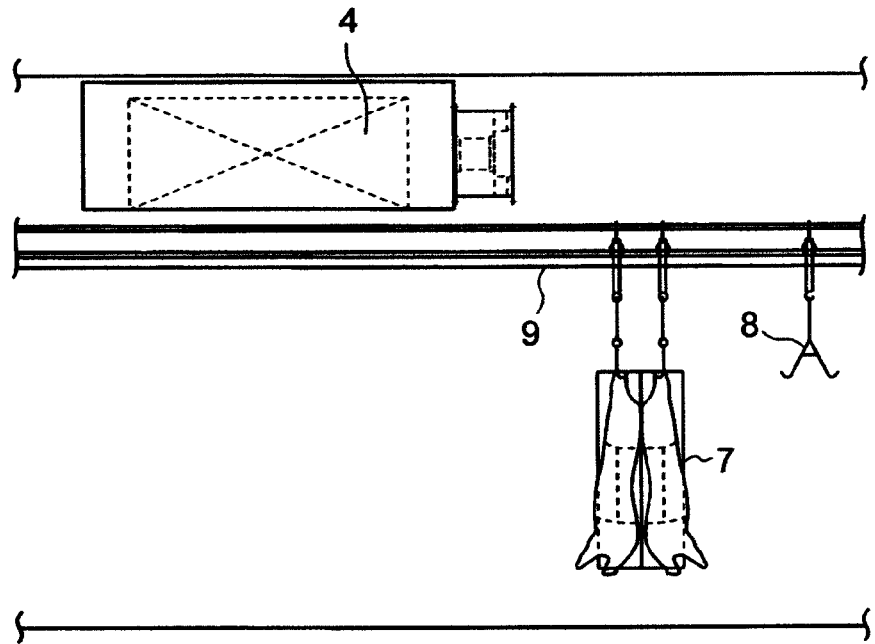
FIG. 7 is a table showing weight reduction rate after surface freezing and tempering treatment.
FIG. 8 is a side elevation view showing a conventional tempering treatment process.

Weight reduction rate after the surface freezing and tempering are shown in FIG. 7. As recognized from FIG. 7, weight reduction rate at both the end of the surface-freezing and end of the tempering treatment were within 1%. Thus, carcass treatment with reduced transpiration of moisture and reduced adhesion of microbes to the surface of the carcass is made possible.

The invention has been described with reference to certain preferred embodiments thereof. It will be understood, however, that modifications and variations are possible within the scope of the appended claims.

The invention claimed is:

1. An apparatus for treating a carcass comprising a surface freezing section and a tempering section:
    wherein the surface freezing section includes a pair of jet flow generator units, one of the jet flow generator units being made from a slit nozzle plate having a number of slits and the other of the jet flow generator units being made from a hole nozzle plate having a number of holes, wherein the carcass is transferred between the slit nozzle plates and the hole nozzle plates in an attitude that the abdominal cavity side of the carcass faces the slit nozzle plates and the skin side of the carcass faces the hole nozzle plates, whereby surface freezing the subcutaneous tissue part of the carcass is performed by cold air jets blowing cold air out from the slits and holes of the slit nozzle plates and hole nozzle plates at a temperature of −20~−40° C., which is equal or lower than the freezing point of a subcutaneous tissue part of the carcass, to impinge on to the skin side and abdominal cavity side of the carcass so as to freeze the subcutaneous tissue part of the carcass from the surface to about 20 mm below the surface, thereby producing a frozen layer, and
    wherein the tempering section performs tempering at a low temperature of 0~15° C. and high humidity to allow the carcass to be lowered in core temperature by releasing heat from the core part to the frozen layer to unfreeze the layer and attain equalization of temperature of the carcass, thereby making the core temperature reach a final target temperature rapidly.

2. An apparatus for treating a carcass according to claim 1, wherein
    the jet flow generator units are so constituted that the jet flow generator is can be easily detached from a duct and the jet generator units are connected to a trolley for transferring the carcass, thereby saving space for maintenance is made easily.

3. An apparatus for treating a carcass according to claim 1, wherein the surface freezing section includes a pair of jet flow generator units, one of the jet flow generator units being made from a slit nozzle plate having a number of slits and the other of the jet flow generator units being made from a hole nozzle plate having a number of holes, and the flow rate of the cold air jets blown out from the slits of the slit nozzle plate is smaller than that from the holes of the hole nozzle plate and the flow velocity of the cold jets from the slits of the slit nozzle plate is larger than that from the holes of the hole nozzle plate.

4. A surface freezing device in an apparatus for treating a carcass, comprising jet flow generator units that produce cold air jet flow to impinge on to the abdominal cavity side and skin side of the carcass, respectively, wherein the jet flow generator units generate relatively large amount of the cold air jets to impinge on to the abdominal cavity side of the carcass and relatively small amount of the cold air jets to impinge on to the skin side of the carcass so that temperature distribution inside the carcass proceeds with time most appropriately.

5. A method for treating a carcass, the method comprising the steps of freezing a subcutaneous tissue part of the carcass and tempering the carcass:

wherein the step of freezing includes a pair of jet flow generator units, one of the jet flow generator units being made from a slit nozzle plate having a number of slits and the other of the jet flow generator units being made from a hole nozzle plate having a number of holes, wherein the carcass is transferred between the slit nozzle plates and the hole nozzle plates in an attitude that the abdominal cavity side of the carcass faces the slit nozzle plates and the skin side of the carcass faces the hole nozzle plates, whereby freezing the subcutaneous tissue part of the carcass is performed by cold air jets blowing cold air out from the slits and holes of the slit nozzle plates and hole nozzle plates at a temperature of $-20$~$-40°$ C., which is equal or lower than the freezing point of a subcutaneous tissue part of the carcass, to impinge on to the skin side and abdominal cavity side of the carcass so as to freeze the subcutaneous tissue part of the carcass from the surface to about 20 mm below the surface, thereby producing a frozen layer, and wherein the step of tempering is performed at a low temperature of $0$~$15°$ C. and high humidity to allow the carcass to be lowered in core temperature by releasing heat from the core part to the frozen layer to unfreeze the layer and attain equalization of temperature of the carcass, thereby making the core temperature reach a final target temperature rapidly.

* * * * *

UNITED STATES PATENT AND TRADEMARK OFFICE
CERTIFICATE OF CORRECTION

PATENT NO. : 8,347,639 B2
APPLICATION NO. : 12/563783
DATED : January 8, 2013
INVENTOR(S) : Naoto Okamoto It is certified that error appears in the above-identified patent and that said Letters Patent is hereby corrected as shown below:

In the Claims:

Column 6, line 58, delete "is" and insert --units--;
Column 6, line 58, delete "easily";
Column 6, line 59, after "jet", insert --flow--; and
Column 6, lines 60 and 61, after "carcass", delete ", thereby saving space for maintenance is made easily".

Signed and Sealed this
Third Day of September, 2013

Teresa Stanek Rea
*Acting Director of the United States Patent and Trademark Office*